(12) United States Patent
Umemoto et al.

(10) Patent No.: US 8,394,521 B2
(45) Date of Patent: Mar. 12, 2013

(54) BATTERY SYSTEM HAVING ASSEMBLED BATTERY

(75) Inventors: Hisashi Umemoto, Kariya (JP);
Tomoyasu Takeuchi, Chita-gun (JP);
Hirokuni Sasaki, Nagoya (JP)

(73) Assignee: Denso Corporation, Kariya (JP)

( * ) Notice: Subject to any disclaimer, the term of this patent is extended or adjusted under 35 U.S.C. 154(b) by 477 days.

(21) Appl. No.: 12/752,490

(22) Filed: Apr. 1, 2010

(65) Prior Publication Data

US 2010/0255360 A1 Oct. 7, 2010

(30) Foreign Application Priority Data

Apr. 1, 2009 (JP) .................................. 2009-89516

(51) Int. Cl.
*H01M 2/02* (2006.01)
(52) U.S. Cl. ...................................................... 429/120
(58) Field of Classification Search .................. None
See application file for complete search history.

(56) References Cited

U.S. PATENT DOCUMENTS

| 6,858,344 B2 | 2/2005 | Marukawa et al. |
| 2008/0247135 A1* | 10/2008 | Inoue et al. ................... 361/695 |

FOREIGN PATENT DOCUMENTS

| JP | 2002-319388 | 10/2002 |
| JP | 2003-007355 | 1/2003 |
| JP | 2003-071674 | 3/2003 |
| JP | 2003-346759 | 12/2003 |
| JP | 2003-071674 | 3/2005 |
| JP | 2008-234936 | 10/2008 |

* cited by examiner

*Primary Examiner* — Patrick Ryan
*Assistant Examiner* — Wyatt McConnell
(74) *Attorney, Agent, or Firm* — Nixon & Vanderhye PC

(57) ABSTRACT

A battery system includes: an assembled battery having battery cells with a pair of electrodes, wherein one electrode of one cell is coupled with another electrode of another cell via a bus bar so that the cells are coupled in series with each other; a fluid supply element for supplying fluid to the bus bar and the electrodes so that the fluid conducts heat to and absorbs heat from the bus bar and the electrodes; and a partition for partitioning the bus bars and for providing multiple passages. The bus bar and the electrodes protrude from the cell. The passages are disposed outside of the assembled battery. The fluid is branched into the passages.

12 Claims, 5 Drawing Sheets

BATTERY SYSTEM HAVING ASSEMBLED BATTERY

CROSS REFERENCE TO RELATED APPLICATION

This application is based on Japanese Patent Application No. 2009-89516 filed on Apr. 1, 2009, the disclosure of which is incorporated herein by reference.

FIELD OF THE INVENTION

The present invention relates to a battery system for cooling and heating an assembled battery having multiple battery cells.

BACKGROUND OF THE INVENTION

Conventionally, a battery system for cooling a battery cell is disclosed in JP-A-2003-346759 and JP-A-2003-71674. The system includes an assembled battery having multiple battery cells, which are electrically coupled with each other, and a blower for blowing air to the assembled battery. When the assembled battery generates heat caused by large current, each battery cell is cooled by the blower. Each cell includes a positive terminal and a negative terminal, which protrude from the surface of the cell. The positive terminal of one cell is electrically coupled with the negative terminal of adjacent cell with a bus bar so that the cells are coupled in series with each other. Thus, an electric power density of the assembled battery is large, and the assembled battery supplies high voltage to a motor of an electric vehicle or a hybrid vehicle. The air blowing from the blower passes through a ventilation passage so that the air flows on an outer surface of the assembled battery. Thus, the bus bar protruding from the outer surface is exposed to the air so that the heat is discharged from the bus bar. Thus, the battery cell is cooled.

In the battery system, when the bus bars exposed on the surface electrically short, insulation in the assembled battery is broken. Thus, the performance of the battery is damaged. For example, when the blower blows air to the battery under a condition that dust, dirt and/or dewdrop are generated, electric insulation between the bus bars and/or terminals may not be sufficiently secured. Further, it is required for the assembled battery to generate high electric power, and also it is required to minimize the dimensions of the battery so as to have high mounting performance. In view of these requirements, the distance between the bus bars and/or terminals is reduced. In this case, it is difficult to secure the electric insulation in the assembled battery.

SUMMARY OF THE INVENTION

In view of the above-described problem, it is an object of the present disclosure to provide a battery system including an assembled battery having multiple battery cells with high cooling performance and electric insulation performance.

According to an aspect of the present disclosure, a battery system includes: an assembled battery having a plurality of battery cells, wherein each cell includes a pair of electrodes, and one electrode of one battery cell is electrically coupled with another electrode of another battery cell via a bus bar so that the plurality of battery cells are coupled in series with each other; a fluid supply element for supplying fluid to the bus bar and the pair of electrodes so that the fluid conducts heat to and absorbs heat from the bus bar and the pair of electrodes; and a partition for partitioning the bus bars and for providing a plurality of passages. The bus bar and the pair of electrodes protrude from a surface of the battery cell. The plurality of passages are disposed outside of the assembled battery, and the fluid is branched into the plurality of passages, and flows through the passages.

In the above system, since the fluid flowing through one bus bar does not flow through another bus bar, which is partitioned from the one bus bar, an insulation property of the system is not damaged by dust, dirt and dew drop, which is carried together with the fluid. Thus, the cooling and heating performance of the system is secured, and the electric insulation property of the system is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
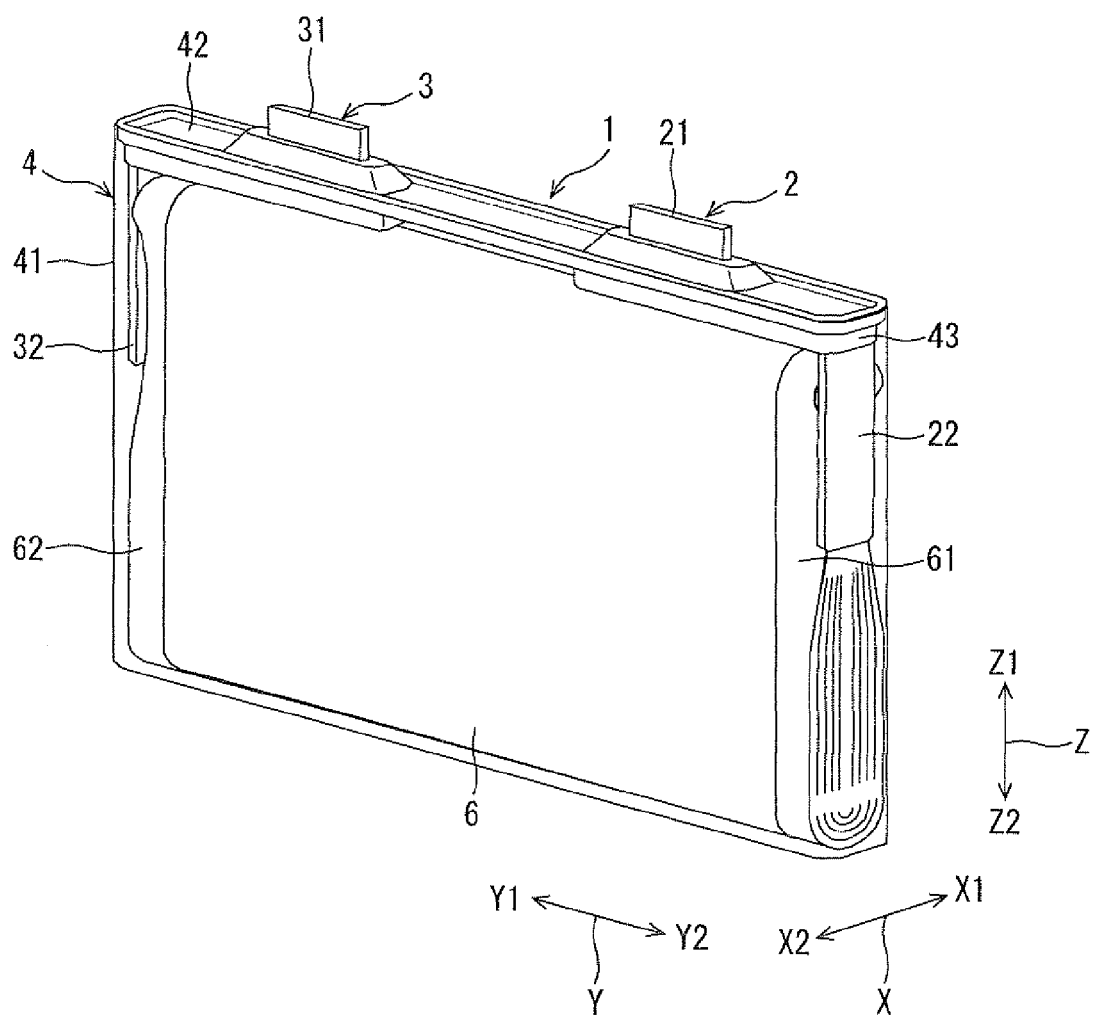
FIG. 1 is a diagram showing an inside structure of a battery cell in an assembled battery of a battery system according to a first embodiment.

A battery system 100 according to a first embodiment is suitably used for a hybrid vehicle and an electric vehicle. The hybrid vehicle has a driving power source provided by a combination of an internal combustion engine and an electric motor. The system 100 cools and heats a secondary battery as the driving power source of the driving motor. The secondary battery is, for example, a nickel hydride secondary battery, a lithium ion secondary battery, or an organic radical battery. The system 100 includes an assembled battery having multiple battery cells 1, which are electrically coupled with each other so that the battery cells 1 are conductive. The assembled battery is accommodated in a casing, and the casing with the battery is arranged under a seat of the vehicle, arranged in space between a rear seat and a trunk room, or arranged in space between a driving seat and a front passenger seat.

The battery cell 1 providing the secondary battery generates heat according to Joule heat caused by current and chemical reaction heat in case of charging and discharging the battery cell. The heat is generated mainly at an electrode as an electric power generation element. Thus, in the system 100, to radiate the generated heat, a bus bar 5 and a fin 7 are used for a heat conductive passage since the bus bar 5 and the fin 7 are directly connected to the electrode. Specifically, cooling medium such as air removes the heat from the electrode.

Figure 2:
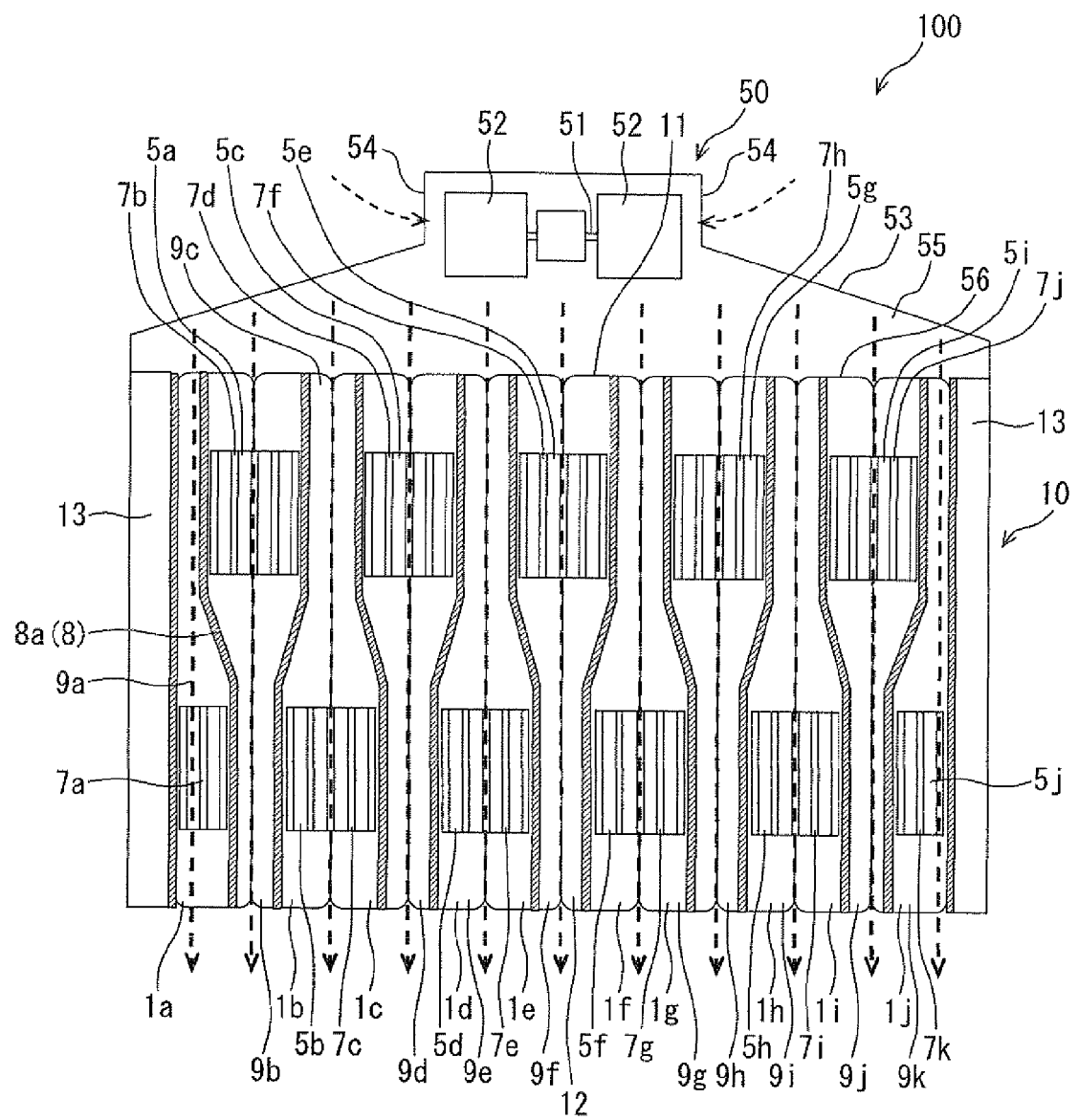
FIG. 2 is a diagram showing an inside structure of a blower and a ventilation passage in the system.
Figure 3:
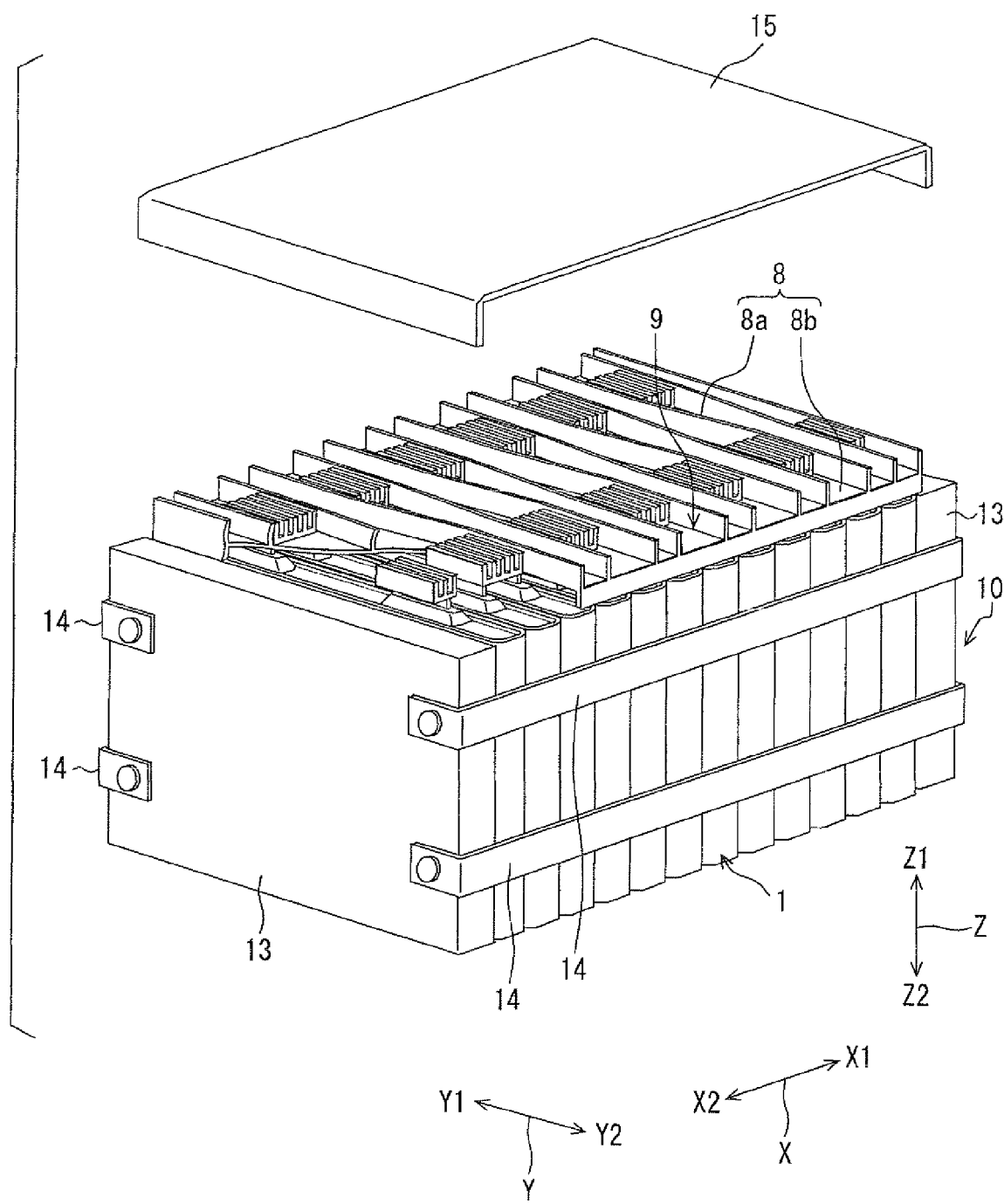
FIG. 3 is a diagram showing multiple passages disposed in an upper portion of the assembled battery.
Figure 4:
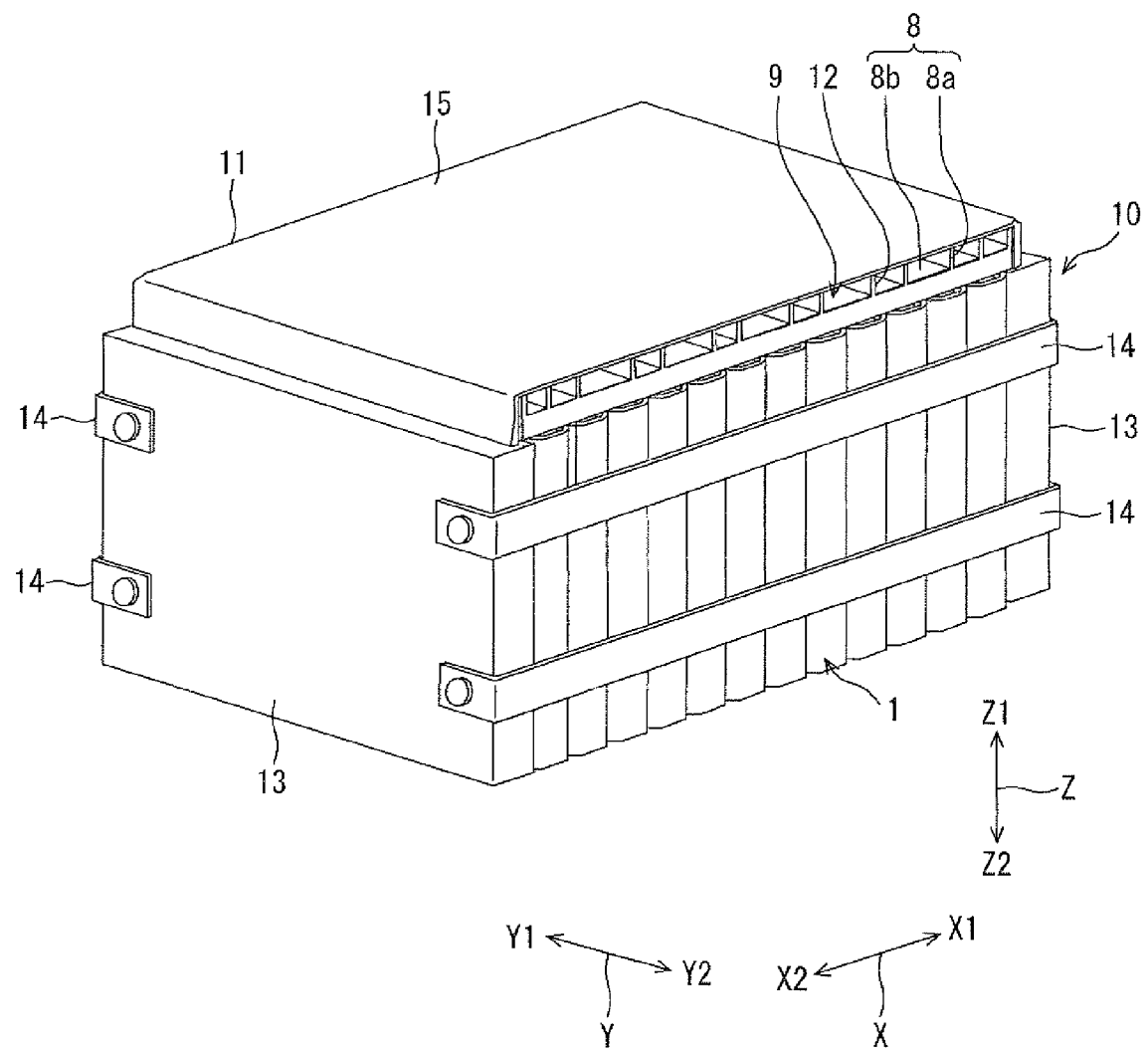
FIG. 4 is a diagram showing the assembled battery and the ventilation passage.

The system 100 will be explained with reference to FIGS. 1-4. FIG. 1 shows an inside structure of the battery cell 1 in an assembled battery 10 of the battery system 100 according to the first embodiment. FIG. 2 shows an inside structure of a blower 50 and a ventilation passage in the system 100. FIG. 3 shows multiple passages disposed in an upper portion of the assembled battery 10. FIG. 4 shows the assembled battery 10 and the ventilation passage. In FIG. 3, a part of a partition 8 for forming multiple passages in the upper portion of the assembled battery 10 is not shown.

An extending direction of the battery cell 1 having a rectangular parallelepiped shape is defined as a blowing direction Y. Specifically, the extending direction of the cell 1 is a longer direction. A stacking direction of the cells 1 is defined as X, which is perpendicular to the blowing direction Y. A height direction Z is an up-down direction Z, which is perpendicular to the blowing direction Y and the stacking direction X.

The system 100 includes the assembled battery 10 and a fluid supply means for supplying fluid to the assembled battery 10. The assembled battery 10 includes multiple battery cells 1, which are electrically coupled with each other so that energization is performed from electrodes 2, 3 via the bus bar 5.

The battery cell 1 is a lithium ion secondary battery, for example. In FIG. 1, each element of the cell 1 disposed inside of a casing 4 is shown as a solid line.

The casing 4 provides an outer cover of the cell 1. The casing 4 includes a can body 41 and a cap 42, which are made of resin having electric conductivity. The cap 42 seals an opening of the can body 41, which is disposed on an upper side of the can body 41. An electrode element 6 is accommodated in the can body 41. A positive side power collection plate 61 is formed on one end of the electrode element 6, which is disposed on a second direction Y2 side along with the blowing direction Y as a longitudinal direction Y. The collection plate 61 extends along with the height direction Z, and is disposed on a side of the can body 41. A negative side power collection plate 62 is formed on the other end of the electrode element 6, which is disposed on a first direction Y1 side along with the longitudinal direction Y. The collection plate 62 extends along with the height direction Z, and is disposed on the other side of the can body 41.

The positive side electrode 2 as a positive electrode 2 is made of aluminum alloy. The positive electrode 2 includes a positive side collection terminal 22 and a positive side electrode terminal 21 as a positive electrode terminal 21. The collection terminal 22 is electrically coupled with the positive side power collection plate 61. The collection terminal 22 is bonded to the collection plate 61 with a welding method. The positive electrode terminal 21 is coupled with the positive collection terminal 22 and protrudes to the outside of the casing 4. The positive electrode terminal 21 is disposed on the second direction Y2 side of the longitudinal direction Y of the cap 42, and penetrates the cap 42 so that the terminal 21 protrudes from the cap 42 upwardly. The negative side electrode 3 as a negative electrode 3 is made of copper alloy. The negative electrode 3 includes a negative side collection terminal 32 and a negative side electrode terminal 31 as a negative electrode terminal 31. The collection terminal 32 is electrically coupled with the negative side power collection plate 62. The collection terminal 32 is bonded to the collection plate 62 with a welding method. The negative electrode terminal 31 is coupled with the negative collection terminal 32 and protrudes to the outside of the casing 4. The negative electrode terminal 31 is disposed on the first direction Y1 side of the longitudinal direction Y of the cap 42, and penetrates the cap 42 so that the terminal 31 protrudes from the cap 42 upwardly. An insulation member 43 having an electric insulation property is formed on a backside of the cap 42. The insulation member 43 electrically isolates between the casing 4, the positive electrode 2 and the negative electrode 3.

The fluid supply means supplies fluid to multiple bus bars 5a-5j, multiples fins 7a-7k and the electrodes 2, 3 so as to conduct heat to the bus bars 5a-5j, the fins 7a-7k and the electrodes 2, 3. The bus bars 5a-5j are defined as a bus bar 5, and the fins 7a-7k are defined as a fin 7. The fluid supply means may be a fluid device integrally formed with the assembled battery 10. Alternatively, the fluid supply means may be a fluid device for supplying fluid via a passage such as a duct. In the present embodiment, the fluid supply means is a blower 50 for blowing air. Thus, the fluid is air.

Each cell 1 has a flat rectangular parallelepiped shape. An exterior case made of resin having an electrical insulation property covers an outer surface of the cell 1. In each cell 1, the positive electrode terminal 21 is disposed on one side of the cap 42 in the longitudinal direction Y, and the negative electrode terminal 31 is disposed on the other side of the cap 42 in the longitudinal direction Y so that the positive electrode terminal 21 is separated apart from the negative electrode terminal 31. The positive and negative electrode terminals 21, 31 are exposed from the exterior case. The cells 1 are stacked in the stacking direction X as a thickness direction X so that the assembled battery 10 as one bundle of batteries is formed. Each cell 1 is fixed by a plate 13 and a belt 14 so that the cell 1 is bundled from both sides in the stacking direction X. The assembled battery 10 is covered with a box (not shown). The box is a rectangular parallelepiped shape case having one surface, which is detachable for maintenance. The box is made of resin or steel. The box includes an attachment portion (not shown), at which the box is fixed to the body of the vehicle with a bolt or the like.

In the assembled battery 10, multiple cells 1 are defined as first to tenth battery cells 1a-1j, which are aligned along with the stacking direction. The positive electrode 2 of one cell 1 is connected to the negative electrode 3 of adjacent cell 1 in series with the bus bar 5 made of a metal plate having excellent conductivity. Thus, the cells 1 are integrated with each other. Thus, multiple battery cells 1 for providing the assembled battery 10 are connected to each other via the bus bars 5 so as to energize an external device. The number of bus bars 5 corresponds to the number of cells 1. The bus bar 5 is connected to the positive electrode terminal 21 and the negative electrode terminal 31 by a screw fixation method or an ultrasonic welding method. Accordingly, the assembled battery 10 is coupled with the external device via a pair of assembled electrodes, which are disposed on both ends of the battery cells connected to each other in series with using the bus bars 5. The assembled electrodes provide a positive side assembled electrode and a negative side assembled electrode, which are disposed on both ends of the assembled battery 10.

Ten battery cells 1 include the first battery cell is to the tenth battery cell 1j. The first battery cell 1a is disposed on a second direction X2 side of the stacking direction X. The positive electrode 2 of the first battery cell 1a is disposed on the second direction Y2 side of the blowing direction Y in the first battery cell 1a. The tenth battery cell 1j is disposed on a first direction X1 side of the stacking direction X. The negative electrode 3 of the tenth battery cell 1j is disposed on the second direction Y2 side of the blowing direction Y in the tenth battery cell 1j. The positive electrode 2 is coupled with the negative electrode 3 through the second to ninth battery cells 1b-1i and the bus bars 5, which coupled between different electrode terminals in the cells 1b-1i so that a connection path between the positive electrode 2 and the negative electrode 3 runs back and forth, i.e., up and down in FIG. 2 in the box along with the blowing direction Y. The positive electrode 2 of the first battery cell 1a is electrically coupled with a positive side assembled electrode of the assembled battery 10. The negative electrode 3 of the tenth battery cell 1j is electrically coupled with a negative side assembled electrode of the assembled battery 10.

The negative electrode 3 of the first battery cell is disposed on the first direction Y1 side of the blowing direction Y is coupled with the positive electrode 2 of the second battery cell 1b disposed on the first direction Y1 side of the blowing direction Y via the bus bar 5a so that the energization is performed between the negative electrode 3 and the positive electrode 2. Further, the negative electrode 3 of the second battery cell 1b disposed on the second direction Y2 side of the blowing direction Y is coupled with the positive electrode 2 of the third battery cell is disposed on the second direction Y2 side of the blowing direction Y via the bus bar 5b so that the energization is performed between the negative electrode 3 and the positive electrode 2. The negative electrode 3 of the third battery cell is disposed on the first direction Y1 side of the blowing direction Y is coupled with the positive electrode 2 of the fourth battery cell 1d disposed on the first direction Y1 side of the blowing direction Y via the bus bar 5c so that the energization is performed between the negative electrode 3 and the positive electrode 2. Here, the fourth battery cell 1d is disposed on the first direction X1 side of the third battery cell 1c, and adjacent to the third battery cell 1c. The negative electrode 3 of the fourth battery cell 1d disposed on the second direction Y2 side of the blowing direction Y is coupled with the positive electrode 2 of the fifth battery cell 1e disposed on the second direction Y2 side of the blowing direction Y via the bus bar 5d so that the energization is performed between the negative electrode 3 and the positive electrode 2. Here, the fifth battery cell 1e is disposed on the first direction X1 side of the fourth battery cell 1d, and adjacent to the fourth battery cell 1d. The negative electrode 3 of the fifth battery cell 1e disposed on the first direction Y1 side of the blowing direction Y is coupled with the positive electrode 2 of the sixth battery cell 1f disposed on the first direction Y1 side of the blowing direction Y via the bus bar 5e so that the energization is performed between the negative electrode 3 and the positive electrode 2. Here, the sixth battery cell 1f is disposed on the first direction X1 side of the fifth battery cell 1e, and adjacent to the fifth battery cell 1e. The negative electrode 3 of the sixth battery cell 1f disposed on the second direction Y2 side of the blowing direction Y is coupled with the positive electrode 2 of the seventh battery cell 1g disposed on the second direction Y2 side of the blowing direction Y via the bus bar 5f so that the energization is performed between the negative electrode 3 and the positive electrode 2. Here, the seventh battery cell 1g is disposed on the first direction X1 side of the sixth battery cell 1f, and adjacent to the sixth battery cell 1f. The negative electrode 3 of the seventh battery cell 1g disposed on the first direction Y1 side of the blowing direction Y is coupled with the positive electrode 2 of the eighth battery cell 1h disposed on the first direction Y1 side of the blowing direction Y via the bus bar 5g so that the energization is performed between the negative electrode 3 and the positive electrode 2. Here, the eighth battery cell 1h is disposed on the first direction X1 side of the seventh battery cell 1g, and adjacent to the seventh battery cell 1g. The negative electrode 3 of the eighth battery cell 1h disposed on the second direction Y2 side of the blowing direction Y is coupled with the positive electrode 2 of the ninth battery cell 1i disposed on the second direction Y2 side of the blowing direction Y via the bus bar 5h so that the energization is performed between the negative electrode 3 and the positive electrode 2. Here, the ninth battery cell 1i is disposed on the first direction X1 side of the eighth battery cell 1h, and adjacent to the eighth battery cell 1h. The negative electrode 3 of the ninth battery cell 1i disposed on the first direction Y1 side of the blowing direction Y is coupled with the positive electrode 2 of the tenth battery cell 1j disposed on the first direction Y1 side of the blowing direction Y via the bus bar 5i so that the energization is performed between the negative electrode 3 and the positive electrode 2. Here, the tenth battery cell 1j is disposed on the first direction X1 side of the ninth battery cell 1i, and adjacent to the ninth battery cell 1i.

All of the battery cells 1a-1j in the assembled battery 10 are electrically coupled with each other via the bus bars 5a-5i in series from the positive electrode 2 of the first battery cell 1a on the second direction Y2 side of the blowing direction Y to the negative electrode 3 of the tenth battery cell 1j on the second direction Y2 side of the blowing direction Y so that current flows in a zigzag manner or in a meandering manner.

The positive side assembled electrode of the assembled battery 10 is electrically coupled with the positive electrode 2 of the first battery cell 1a on the second direction Y2 side of the blowing direction Y, and the negative side assembled electrode of the assembled battery 10 is electrically coupled with the negative electrode 3 of the tenth battery cell 1j on the second direction Y2 side of the blowing direction Y. The positive side assembled electrode of the assembled battery 10 and the negative side assembled electrode of the assembled battery 10 are electrically coupled with an object device such as a driving motor, to which the battery system 100 supplies electricity. Specifically, the positive and negative side assembled electrodes of the assembled battery 10 are connected to a relay device, respectively. A current sensor is arranged between the positive and negative side assembled electrodes of the assembled battery 10 and the relay device. The current sensor detects current flowing through the assembled battery 10. A current signal detected by the current sensor is output to a control circuit. The current signal corresponds to charge current and discharge current.

Multiple passages 9a-9k for flowing fluid such as air are arranged over the assembled battery 10. Specifically, the passages 9a-9k are disposed in space, which is disposed on an outside of the battery 10. Multiple passages 9a-9k are divided by the partition 8 so that the partition divides the bus bars 5 in the assembled battery 10. The partition 8 includes a wall 8a, which protrudes from an upper surface of the assembled battery 10 upwardly. The wall 8a divides the space between the bus bars 5 along with the stacking direction X so that the space disposed on the outside and upside of the assembled battery 10 is divided into multiple passages.

Multiple passages divided by the partition 8 may be individual passages, each of which corresponds to a respective bus bar 5. Specifically, each bus bar 5 corresponds to one individual passage. For example, as shown in FIG. 2, the first bus bar 5a corresponds to the first passage 9b, the second bus bar 5b corresponds to the second passage 9c, the third bus bar 5c corresponds to the third passage 9d, the fourth bus bar 5d corresponds to the fourth passage 9e, the fifth bus bar 5e corresponds to the fifth passage 9f, the sixth bus bar 5f corresponds to the sixth passage 9g, the seventh bus bar 5g corresponds to the seventh passage 9h, the eighth bus bar 5h corresponds to the eighth passage 9i, and the ninth bus bar 5i corresponds to the ninth passage 9j.

The fin 7b-7j is formed on each bus bar 5a-5i. The fin 7b-7j conducts heat from the cell 1. The fin 7 has a large surface area in order to increase a contact area with air supplied from the blower 50. Thus, the fin 7 functions as a member for increasing the surface area. Other fins 7a, 7k are formed over the positive electrode 2 and the negative electrode 3 of the cell 1 in the first direction Z1 of the up-down direction Z, respectively. The other fins 7a, 7k is disposed in the box. Specifically, the fin 7a disposed on a left under side of the cell in FIG. 2 is electrically connected to the positive electrode 2 of the first battery cell 1a. The fin 7k disposed on a right under side of the cell 1 in FIG. 2 is electrically connected to the negative electrode 3 of the tenth battery cell 1*j*. The positive electrode 2 and the fin 7*a* are arranged in a passage 9*a*. The negative electrode 3 and the fin 7*k* are arranged in another passage 9*k*.

The fin 7 is made of aluminum or aluminum alloy, which has excellent heat conductivity. The fin 7 has a corrugated shape. Peaks and throughs are alternately repeated in the stacking direction X. The peaks and the throughs extend straightly along with the blowing direction Y so that the air flows between the peaks and the throughs. Specifically, each fin 7 is formed along with a flowing direction of the fluid, i.e., the blowing direction Y. In this case, the fluid flows smoothly so that the fin 7 contacts the fluid surely and sufficiently. Accordingly, the fin 7 provides excellent heat radiation.

The partition 8 will be explained with reference to FIGS. 3 and 4. The partition 8 includes a wall 8*a* and a bottom 8*b*. The wall 8*a* protrudes from the upper surface of the assembled battery 10 upwardly. The bottom 8*b* provides a base of the walls 8*a*. The walls 8*a* is connected to the walls 8*a*. The top of the wall 8*a* is disposed on an upper side of the fin 7 so that the height of the wall 8*a* is larger than a total of the height of the bus bar 5 and the height of the fin 7. The bottom 8*b* has dimensions, which almost corresponds to the upper surface of the assembled battery 10. The bottom 8*b* of the fin 7 covers the upper surface of the assembled battery 10 when the fin 7 is assembled in the battery 10. The bottom 8*b* has multiple holes, into which the electrode terminals 21, 31 in each battery cell 1 are inserted. The bottom 8*b* is disposed near the cell 1, compared with the bus bar 5 and the fin 7. The bottom 8*b* provides a bottom of the passage 9*a*-9*k*. The partition 8 is made of resin having an electric insulation property such as poly ethylene resin, poly propylene resin or phenol resin.

When the partition 8 is disposed on the assembled battery 10, the electrode terminal 21, 31 is inserted into a corresponding hole of the bottom 8*b*. Thus, the electrode terminal 21, 31 penetrates the bottom 8*b*. Then, the partition 8 is arranged on the assembled battery 10. Next, under a condition that the partition 8 is arranged on the upper surface of the assembled battery 10, the positive electrode terminal 21 is bonded to an adjacent negative electrode terminal 31 with the bus bar 5. Then, the fin 7 is formed on the bus bar 5. Alternatively, the fin 7 may be preliminary arranged on the bus bar 5, and the bus bar 5 together with the fin 7 may be attached to the electrode terminal 21, 31. Thus, the bottom 8*b* approximates the bus bar 5. Each bus bar 5 is separated from the adjacent bus bar 5 with the wall 8*a*, which is disposed on an outside of the bottom 8*b*. Accordingly, the partition 8 insulates the bus bar 5 disposed in the passage, which is divided by the partition 8, from other bus bars 5 disposed in other passages. Specifically, the partition 8 provides electric insulation between the bus bar 5, which is disposed outside of the assembled battery 10.

The cover 15 is arranged from an upper side when the partition 8 is arranged on the assembled battery 10. The cover 15 has a C shape. The dimensions of the cover 15 substantially correspond to the upper surface of the assembled battery 10. The cover 15 covers all of the passages 9. After the cover 15 is arranged on the assembled battery 10, only a fluid inlet port 11 and a fluid outlet port 12 of each passage 9*a*-9*k* are opened to the outside of the assembled battery 10 so that the passage 9*a*-9*k* provides a tunnel passage having two openings.

The fluid inlet port 11 in each passage 9 is arranged on the first direction Y1 side of the assembled battery 10. The fluid is introduced into the assembled battery 10 via the fluid inlet port 11. The fluid outlet port 12 in each passage 9 is arranged on the second direction Y2 side of the assembled battery 10. The fluid is discharged from the assembled battery 10 via the fluid outlet port 12. The fluid outlet port 12 faces the fluid inlet port 11. The fluid outlet port 12 is disposed on the other side of the fluid inlet port 11, and the height of the fluid outlet port 12 is almost the same as the height of the fluid inlet port 11.

Each passage 9 corresponding to the bus bar 5 is partitioned from other passages 9 so that the passage 9 is a partitioned path. The cross section of the passage 9 extends along with the blowing direction Y. The length of the passage in the up-down direction Z is comparatively small, so that the passage 9 has a rectangular shape. All passages 9*a*-9*k* substantially cover a whole of the upper surface of the assembled battery 10. The passages 9*a*-9*k* are independent from each other in a range between the fluid inlet port 11 and the fluid outlet port 12. Thus, the air flowing in each passage 9 is not mixed to air in other passages 9. The air introduced into the passage 9*a*-9*k* via the fluid inlet port 11 is not mixed to air flowing in other passages 9*a*-9*k* until the air is discharged to the outside of the assembled battery 10. The air is discharged from the assembled battery 10 via the fluid outlet port 12 so that the air is discharged to the outside of the box. The air supplied from the blower 50 forcibly flows in the passage 9*a*-9*k* and is branched or distributed into the passages 9*a*-9*k*. Thus, an initial temperature at the fluid inlet port 11 in each passage 9*a*-9*k* is the same. Thus, heat radiation amount from the bus bar 5 and the fin 7 in each passage 9*a*-9*k* becomes homogeneously. Thus, the temperature difference between multiple battery cells 1 is reduced.

Next, the blower 50 is one of the fluid supplying means. The blower 50 is formed to be adjacent to one side of the assembled battery 10 on the first direction Y1 side of the blowing direction Y. The blower 50 includes a Sirocco fan 52 and a casing 53. The Sirocco fan 52 is driven by a motor or the like so that the number of rotations is controllable. The casing 53 introduces the fluid with using rotation of the Sirocco fan 52 and discharges the air. The blower 50 includes a discharge opening 56, which corresponds to the length of one side of the assembled battery 10 on the first direction Y1 side along with the stacking direction X. The blower 50 supplies air to the assembled battery 10. The casing 53 of the blower 50 includes a suction opening 54, which is disposed on one side of the assembled battery 10 on the first direction Y1 side. The air is suctioned from the suction opening 54 along with the stacking direction X. The passage 55 is formed in the assembled battery 10 such that the passage 55 has a folding fan shape from the suction opening 54 to the discharge opening 56.

The Sirocco fan 52 is fixed to a rotation axis 51 of the motor, which is arranged horizontally. The rotation axis 51 is arranged such that an axial center of the axis 51 is disposed in a height range of the assembled battery 10 in the up-down direction. The casing 53 includes a thrall portion, which surrounds the Sirocco fan 52. The casing 53 includes two suction openings 54, each of which opens on a corresponding side of the casing 53 in the axial direction of the Sirocco fan 52. The casing 53 is fixed to a vehicle side device or an accommodation box (not shown) such that an attachment leg integrated with the casing 53 is fixed to the box or the device with a fixation means such as a bolt.

A passage 55 from a path between an inner wall of the casing 53 and a forward blade of the Sirocco fan 52 to the discharge opening 56 spreads toward the discharge opening 56. This folding fan shaped passage 55 is disposed at a position higher than the Sirocco fan 52. The discharge opening 56 is arranged on an upper side of the box. The opening 56 is connected to the fluid inlet port 11 of multiple passages 9. The length of the discharge opening 56 in the stacking direction X is substantially the same as the length of the assembled battery 10 in the stacking direction X.

The air blown from the discharge opening 56 flows to the up side of the assembled battery 10. The air is branched at the discharge opening 56 into each passage 9a-9k. The air is introduced into each passage 9a-9k, so that the air contacts the bus bar 5a-5j and the fin 7a-7k. Thus, the air absorbs heat from the bus bar 5a-5j and the fin 7a-7k so that the air cools the battery cell 1 homogeneously. The heat of the cell 1 absorbed in each passage 9a-9k is discharged to the outside of the passage 9 together with the discharged air.

A battery monitoring unit is accommodated in the accommodation box. The battery monitoring unit receives detection results from various sensors for monitoring a state of the battery such as a voltage and a temperature. A control circuit unit, a wiring harness and the like are accommodated in the accommodation box. The control circuit unit has a control circuit for controlling the battery and for controlling the motor for driving the blower 50. The wiring harness connects various devices. The control circuit unit communicates with the battery monitoring unit so that the control circuit unit as a battery ECU monitors the state of the assembled battery 10. Thus, the control circuit unit is electrically coupled with the assembled battery 10 with multiple wires. The control circuit unit communicates with an external controller. Alternatively, the control circuit unit may output an instruction for the external controller of the assembled battery 10.

The control circuit unit detects the number of rotations of a fan of the blower 50. Further, the control circuit unit detects temperature of air to be introduced into the assembled battery 10, i.e., temperature of air to be suctioned by the fan, with using a suction air temperature sensor. The control circuit unit calculates based on the battery temperature detected by a sensor, the suction air temperature detected by the suction air temperature sensor, and a control program stored preliminary. Thus, the control circuit unit controls the number of rotations of the fan in order to control the temperature of the cell 1 within a predetermined optimum temperature range so that the battery is appropriately cooled. The control circuit unit controls the motor. The control circuit unit performs a PWM control process for changing a duty ratio of a pulse wave of a voltage so as to modulate the wave. For example, the control circuit unit controls variably the number of rotations of the fan according to a target cooling performance by the PWM control process. Thus, the control circuit unit controls the temperature of the battery cells 1, which is detected by a temperature sensor or the like.

When the control circuit unit determines based on the result of the battery monitoring unit that it is necessary to cool the battery, a driving voltage is supplied to the motor of the blower 50 so that the fan rotates. Thus, the air outside of the system 100 is suctioned by the blower 50, and then, the air is supplied to the passages 9. The air branched to each passage 9a-9k draws heat from the corresponding cell 1 so that the cell 1 is cooled. The air in one passage 9a-9k is discharged to the outside of the system 100 without being mixed with air flowing in other passages 9a-9k.

The effect of the system 100 will be explained. The system 100 includes the assembled battery 10, the blower 50 and the partition 8. The assembled battery 10 is formed from multiple battery cells 1. The electrodes 2, 3 of the cells 1 are electrically coupled in series with each other via the bus bars 5. The blower 50 as the fluid supplying means supplies air as the fluid for conducting heat with multiple bus bars 5. The bus bar 5 protrudes from the surface of the assembled battery 10. The partition 8 partitions between the bus bars 5 of the assembled battery 10, and forms the passage 9, which is disposed outside of the assembled battery 10. The air supplied to the assembled battery 10 by the blower 50 is branched into multiple passages 9a-9k so that the air flows from an upstream side to a downstreamside in each passage 9a-9k.

In the above system 100, the passages 9 is disposed outside of the assembled battery 10, and the air flowing in the passages 9 is not mixed with each other. Thus, the fluid flowing through the passage 9 conducts heat with the bus bar 5, i.e., the fluid draws heat from or transfers heat to the bus bar 5 when the heat is transmitted from the cell 1 to the bus bar 5. Thus, the fluid branched into multiple passages 9 cools or heats the assembled battery 10 appropriately. Since the partition 8 divides between the bus bars 5 so that the passages 9 are partitioned by the partition 8, the branched fluid flows through the bus bars 5. Specifically, the fluid flowing through the bus bar 5 partitioned by the partition 8 does not flows through another bus bar 5 in another passage. Accordingly, the bus bar in one passage and the other bus bar in the other passage do not form a current path with using the fluid. Specifically, conductive path between one bus bar in one passage and another bus bar in another passage via the fluid is not formed.

Accordingly, even if a dew drop is attached to the surface of the assembled battery 10, the electrodes 2, 3, the bus bars 5, the fins 7 and the like or even if a dust or a dirt is attached to them, conductive portions in the assembled battery 10 do not short-circuit with the dew drop, the dust or the dirt carried by the fluid. Thus, the insulation in the assembled battery 10 is not reduced.

Further, each passage 9a-9k is individually and independently formed in a corresponding bus bar 5. In this case, one passage 9 accommodates one bus bar 5 as a conductive portion. Thus, the fluid flowing through one passage 9 is not mixed to the fluid flowing though other passages 9, i.e., the fluid does not contact the bus bars disposed in other passages 9. Specifically, the fluid flowing through one passage 9 conducts heat with a corresponding bus bar 5 only, and then, the fluid is discharged from the passage 9. Thus, the insulation between the one bus bar 9 and the other bus bars 9 is surely secured. The system has high insulation performance.

The fluid inlet port 11 in each passage 9a-9k is disposed on the first direction Y1 side of the assembled battery 10, and the fluid outlet port 12 is disposed on the second direction Y2 side of the assembled battery 10. The fluid outlet port 12 faces the fluid inlet port 11.

In the above case, the fluid outlet port 12 is disposed on a line of sight from the inlet port 11. Specifically, a path between the fluid outlet port 12 and the fluid inlet port 11 is straight. Thus, the passage 9 does not wind. The fluid introduced into the passage from the inlet port 11 flows through the passage 9 smoothly, and then, the fluid is discharged from the outlet port 12. Thus, pressure loss of the fluid is improved, and cooling performance is improved.

The partition 8 includes the walls 8a and the bottom 8b. The wall 8a protrudes from the upper surface of the assembled battery 10 upwardly. The bottom 8b provides a base of the walls 8a, which is aligned along with the stacking direction X. The walls 8a are connected with the bottom 8b. The bottom 8b covers the upper surface of the assembled battery 10. The bottom 8b is disposed near the cell 1, compared with the bus bar 5 and the fin 7. The bottom 8b provides a bottom of the passage 9.

In this case, the partition 8 provides to arrange a portion, to which the dew drop, the dust or the dirt is easily attached, in each passage 9a-9k. For example, the dew drop, the dust or the dirt may be easily attached to a part protruding from the surface of the assembled battery 10. The protruding part is arranged in the passage so that short-circuit between the protruding parts in different passages is restricted even if the dew drop, the dust or the dirt is carried with the air and the dew drop, the dust or the dirt is attached to the protruding part as a conductive part. Specifically, conductive parts in different passages are restricted from being electrically connected to each other with the dew drop, the dust or the dirt. Thus, the short-circuit between the conductive parts in different passages is restricted. This effect remarkably appears for usage of the system 100 to a vehicle, which is used under severe environment. Thus, the partition 8 provides a useful insulation structure for a battery used in a vehicle.

Each passage 9a-9k is formed by the partition 8 made of insulation material, and the passage 9a-9k is partitioned. Accordingly, since the passage is partitioned by the insulation material, the insulation performance between the passages is much improved.

All of the fluid inlet ports 11 in the passages 9 are disposed on the first direction Y1 side of the assembled battery 10. In this case, maintenance of the fluid supplying means such as the blower 50 is easily performed. Further, since the fluid inlet ports 11 are aggregated, it is not necessary to use a duct for introducing the fluid. Thus, the dimensions of the fluid supplying means are reduced. Specifically, an arrangement space for each element in the fluid supplying means is reduced. The mounting performance of the system is improved.

The fin 7 is formed on the bus bar 5, which is arranged in a corresponding passage 9. In this case, the heat radiation area of heat generated in the cell 1 and the heat receiving area from the fluid are increased. Thus, the cooling performance and the heating performance are improved.

The blower 50 includes the fan and the casing 53. The casing 53 provides to introduce the fluid and discharges the fluid with using rotation of the fan. The fan is accommodated in the casing 53. The discharge opening 56 of the casing 53 is connected to the fluid inlet port 11 in each passage 9a-9k. The casing 53 is integrally formed with the assembled battery 10. The casing 53 is disposed on one side of the assembled battery 10 on the first direction Y1 side.

In this case, the blower 50 suctions air from the suction opening 54, and distributes the air to each passage 9a-9k via the discharge opening 56. The blower 50 supplies air to the electrodes 2, 3, the bus bar 5 and the fin 7 in each passage 9a-9k. Thus, one blower 50 disposed on the first direction Y1 side of the assembled battery 10 supplies air to multiple passages 9a-9k, so that the dimensions of the system 100 are minimized, and the structure of the fluid supplying means is simplified.

Each passage 9a-9k has a cross section of a flat shape. Thus, even when the air volume of the air introduced by the blower 50 is small, the flowing speed of the air is large. Thus, the stream of the cooling air has high flowing speed. Thus, the system has a low noise and high cooling performance from cooling the cell 1.

Second Embodiment

Figure 5:
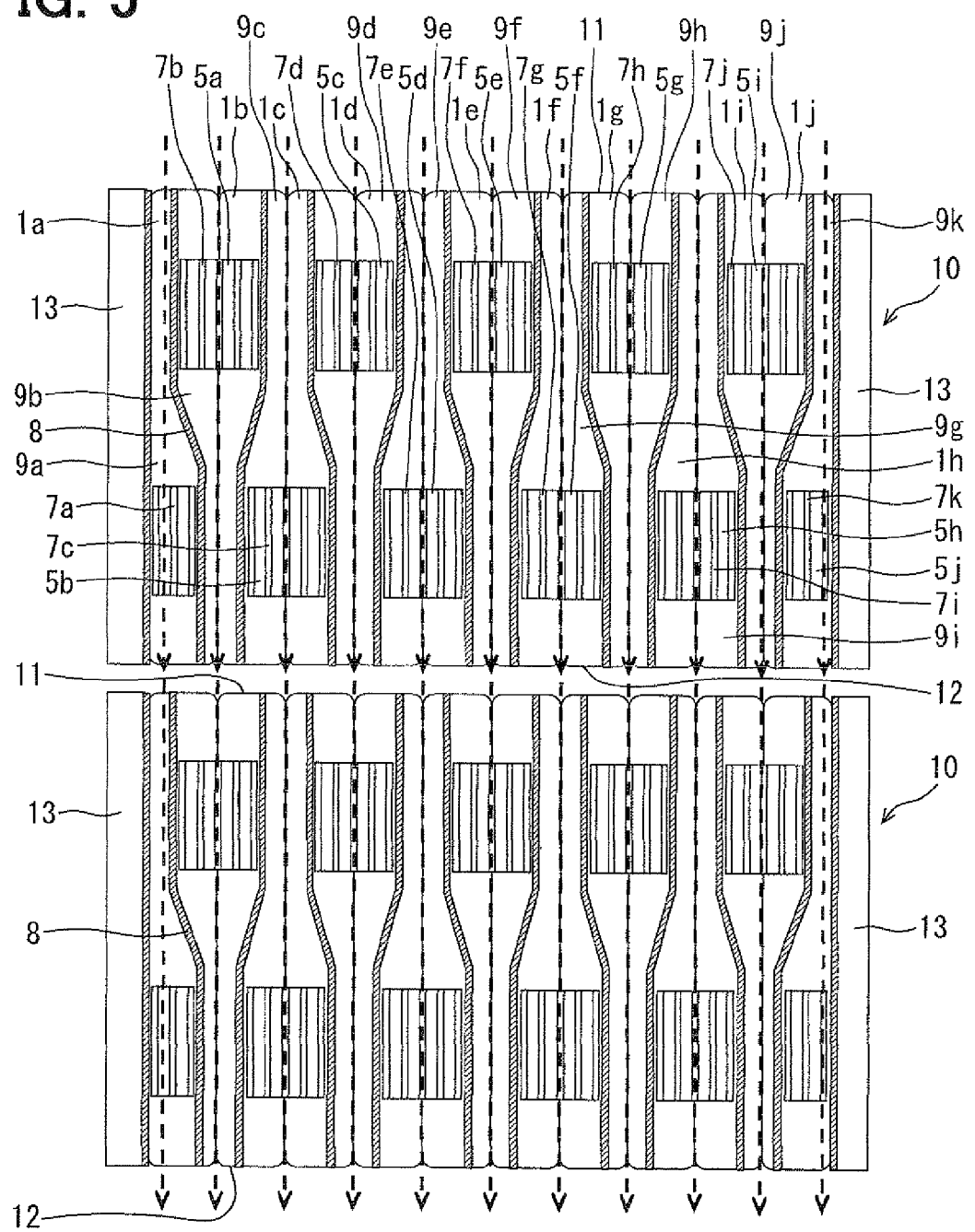
FIG. 5 is a diagram showing a ventilation passage in an assembled battery according to a second embodiment.

FIG. 5 shows a blowing air passage in a battery system. In FIG. 5, the fluid supplying means such as the blower 50 is not shown. FIG. 5 only shows the assembled battery 10.

As shown in FIG. 5, in the system, two assembled batteries 10 having the same structure as a combination battery are arranged along with the blowing direction Y from the first direction Y1 to the second direction Y2. Thus, multiple assembled batteries 10 are arranged along with the blowing direction Y.

The first assembled battery 10 disposed on the first direction Y1 side has the fluid outlet port 12 of the multiple passages 9, which faces the fluid inlet port 11 of multiple passages 9 in the second assembled battery 10, which is disposed on the second direction Y2 side and adjacent to the first assembled battery 10. A distance between the fluid inlet port 11 of the second assembled battery 10 and the fluid outlet port 12 of the first assembled battery 10 is maintained by a predetermined value. Thus, high insulation performance between the first and second assembled batteries 10 is maintained.

The fluid supplying means (not shown) for supplying fluid to the combination battery has a fluid discharge opening, which is connected to the fluid inlet port 11 of the passages 9 of the first assembled battery 10 on the first direction Y1 side. The air to be introduced to the combination battery is supplied from single fluid supplying means. In the combination battery, two assembled batteries 10 are electrically coupled in series with each other. The combination battery may include three or more assembled batteries 10.

One assembled electrode of the first assembled battery 10 is connected to another assembled electrode of the second assembled battery 10 via a bus bar 5 in series, and the one assembled electrode has a polarity different from another assembled electrode. Thus, the adjacent two assembled batteries 10 provide the combination battery. Accordingly, a positive side combination electrode of the combination battery and a negative side combination electrode of the combination battery provide electricity to an external device and receive electricity from an external power source. Specifically, the positive side combination electrode is provided by one assembled electrode of one assembled battery, which is provided by one electrode of one cell in the one assembled battery, and the negative side combination electrode is provided by another assembled electrode of another assembled battery, which is provided by another electrode of another cell in another assembled battery.

When the air is supplied by the fluid supplying means, the air introduced into each passage 9a-9k of the first assembled battery 10 flows in the passage 9, and then, the air is discharged from the fluid outlet port 11. After than, the air is introduced into each passage 9a-9k of the second assembled battery 10 via the fluid inlet port 11. Then, the air flows through the passage 9 of the second assembled battery 10, and then, the air is discharged from the fluid outlet port 12 so that the air is discharged to the outside of the box.

The effect of the above system will be explained. The system includes multiple assembled batteries 10, which are aligned from the first direction Y1 side to the second direction Y2 side. The fluid outlet port 12 of multiple passages 9 in one assembled battery 10 disposed on the first direction Y1 side faces the fluid inlet port 11 of multiple passages 9 in another assembled battery 10 disposed on the second direction Y2 side and adjacent to the one assembled battery 10.

The fluid flows through the passages 9 in the one assembled battery on the first direction Y1 side so that the fluid cools the cells 1, and then, the air is discharged from the fluid outlet port 12. After that, the air is introduced into the passages 9 of the adjacent assembled battery 10 with maintaining the flowing direction. Accordingly, the combination battery provided by multiple assembled batteries is effectively cooled or heated with the fluid flowing in one direction.

Multiple assembled batteries 10 are arranged to along from the first direction Y1 side to the second direction Y2 side. Further, all of the passages 9 in all of the assembled batteries 10 have the same height. Thus, an outer surface of the system is flat. Thus, the mounting performance of the system is improved.

Other Embodiments

In the present embodiments, the system 100 supplies electricity to the driving motor of the vehicle. Alternatively, the system 100 may supply electricity for operating various apparatus in a building, a house or a factory. Alternatively, the system 100 may be used for a store or a residential building or home.

In the above embodiments, each bus bar 5 corresponds to one passage 9. Alternatively, the partition 8 may not partition all of the bus bars 5 as long as the partition 8 provides to secure insulation performance equal to or higher than a predetermined level. For example, even when two bus bars are arranged in one passage, and insulation between the two bus bars is sufficiently secured, the partition 8 contributes to improve insulation performance of the system.

The above system 100 may include a heating means such as an electric heater so that the fluid supplying means supplies the fluid heated by the heating means to each passage. In this case, when the temperature of the battery cell 1 is reduced, the cell is heated so that the charging efficiency and the discharge efficiency are improved. Thus, the system provides to execute warm-up operation.

In the above system 100, the passage 9 partitioned by the partition 8 is arranged on the upper surface of the assembled battery 10. Alternatively, multiple passages 9 may be arranged on a side surface of a bottom surface of the assembled battery 10. In this case, the electrodes 2, 3, the bus bar 5 and the fin 7 in the assembled battery 10 as a cooling object is arranged in a corresponding passage 9.

In the system 100, the cooling object such as the electrode 2, 3, the bus bar 5 and the fin 7 is disposed on the upper surface of the assembled battery 10. Alternatively, the passage may be arranged on both of the upper surface and the bottom surface of the assembled battery 10 when the system 100 is mounted on the vehicle. Alternatively, the passage may be arranged in the up-down direction of the vehicle when the system 100 is mounted on the vehicle.

In the second embodiment, two assembled batteries 10 are aligned along with the blowing direction Y so that the combination battery is formed. Alternatively, two assembled batteries 10 may be aligned along with the stacking direction X. Further, multiple assembled batteries 10 may be aligned along with the stacking direction X or the blowing direction Y.

The cells 1 may be arranged in the box along with the stacking direction X such that one cell 1 is spaced apart from an adjacent cell 1. Further, an insulation member may be formed between two adjacent cells. Alternatively, no insulation member may be formed between two adjacent cells 1. Each cell 1 has a rectangular parallelepiped shape with eight corners. Alternatively, each cell 1 may have rounded rod shape. In this case, electrodes may protrude from both ends of the rod in an axial direction.

In the above embodiments, the fluid supplying means is a Sirocco fan such as the blower 50. Alternatively, the fluid supplying means may be other fan. For example, the fluid supplying means may be an axial fan, a diagonal flow fan, other centrifugal fan such as a radial fan and a turbo fan or the like.

The above disclosure has the following aspects.

According to an aspect of the present disclosure, a battery system includes: an assembled battery having a plurality of battery cells, wherein each cell includes a pair of electrodes, and one electrode of one battery cell is electrically coupled with another electrode of another battery cell via a bus bar so that the plurality of battery cells are coupled in series with each other; a fluid supply element for supplying fluid to the bus bar and the pair of electrodes so that the fluid conducts heat to and absorbs heat from the bus bar and the pair of electrodes; and a partition for partitioning the bus bars and for providing a plurality of passages. The bus bar and the pair of electrodes protrude from a surface of the battery cell. The plurality of passages are disposed outside of the assembled battery, and the fluid is branched into the plurality of passages, and flows through the passages.

In the above system, since the fluid flowing through one bus bar does not flow through another bus bar, which is partitioned from the one bus bar, an insulation property of the system is not damaged by dust, dirt and dew drop, which is carried together with the fluid. Thus, the cooling and heating performance of the system is secured, and the electric insulation property of the system is improved.

Alternatively, the passages may be independent from each other so that the fluid flowing through one passage is not mixed to the fluid flowing through another passage, and each bus bar is accommodated in a corresponding passage. In this case, one passage corresponds to one bus bar. Thus, the fluid passing through the passage conduct heat with a corresponding bus bar without conducting heat with another bus bar. Thus, insulation between the bus bars is sufficiently secured, so that the insulation performance of the system is much improved.

Further, each passage may include a fluid inlet port and a fluid outlet port. The fluid is introduced into the passage via the fluid inlet port, and the fluid is discharged from the passage from the fluid outlet port. All of the fluid inlet ports are disposed on a first side of the system, and all of the fluid outlet ports are disposed on a second side of the system. The fluid inlet port faces the fluid outlet port. In this case, the fluid smoothly flows through the passage. Thus, pressure loss of the fluid is reduced, and the cooling and heating performance is improved.

Alternatively, the battery system may further include: one or more assembled batteries. The assembled batteries are arranged along with a direction from the first side to the second side, and all of the fluid outlet ports in one assembled battery disposed on the first side face all of the fluid inlet ports in another assembled battery disposed on the second side and adjacent to the one assembled battery. In this case, a combination battery provided by multiple assembled batteries is effectively cooled or heated by the fluid, which flows in one direction.

Alternatively, the partition may be made of insulation material. In this case, insulation performance between the passages is much improved. Thus, the insulation between the bus bars is secured.

Alternatively, each bus bar may include a member for increasing a surface area of the bus bar. The member provides to increase a contact area with the fluid, and the member is accommodated in a corresponding passage. In this case, a heat radiation area and a heat receiving area of the cell are increased. Thus, the cooling performance and the heating performance of the system are improved.

Alternatively, the fluid supplying element may include a fan and a casing for accommodating the fan. The casing suctions the fluid from a suction opening according to rotation of the fan, and discharges the fluid from a discharge opening. Each passage is coupled with the discharge opening, and the casing is integrated with the assembled battery. In this case, since the fluid supplying element and the assembled battery are integrated, the dimensions of the system are minimized. Further, since the fluid supplying element has a simple structure, maintenance performance of the system is improved. Further, the number of part of the system is reduced.

Further, each passage may extend along with a flowing direction of the fluid. The fluid supplying element is a blower for blowing air, and the fluid is air. The air absorbs heat from the bus bar and the pair of electrodes so that the assembled battery is cooled, and the air conducts heat to the bus bar and the pair of electrodes so that the assembled battery is heated. Furthermore, each passage may include a fluid inlet port and a fluid outlet port, and a path between the fluid outlet port and the fluid inlet port is straight. Further, all of the fluid inlet ports may be disposed on a first side of the system, and all of the fluid outlet ports are disposed on a second side of the system. The first side is opposite to the second side. Each battery cell extends along with the flowing direction of the fluid. One electrode of each battery cell provides a positive electrode, and the other electrode provides a negative electrode. The positive electrode of one battery cell is coupled with the negative electrode of an adjacent battery cell. Further, current in the assembled battery may flow in a zigzag manner. Each battery cell has a rectangular parallelepiped shape. The plurality of battery cells are stacked in a stacking direction, which is perpendicular to the flowing direction of the fluid. A longitudinal direction of the rectangular parallelepiped shape of each battery cell is in parallel to the flowing direction of the fluid. Further, each bus bar may include a fin for increasing a surface area of the bus bar so that a cooling and heating performance of the battery cell is increased, and each fin has a corrugated shape so that peaks and throughs are alternately repeated in the stacking direction.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A battery system comprising:
    an assembled battery having a plurality of battery cells, wherein each cell includes a pair of electrodes, and one electrode of one battery cell is electrically coupled with another electrode of another battery cell via a bus bar so that the plurality of battery cells are coupled in series with each other;
    a fluid supply element for supplying fluid to the bus bar and the pair of electrodes so that the fluid conducts heat to and absorbs heat from the bus bar and the pair of electrodes; and
    a partition for partitioning the bus bars and for providing a plurality of passages,
    wherein the bus bar and the pair of electrodes protrude from a surface of the battery cell,
    wherein the plurality of passages are disposed outside of the assembled battery,
    wherein the fluid is branched into the plurality of passages, and flows through the passages, and
    wherein the partition is disposed on said surface of the battery cell from which the bus bar and the pair of electrodes protrude.

2. The battery system according to claim 1,
    wherein the passages are independent from each other so that the fluid flowing through one passage is not mixed to the fluid flowing through another passage, and
    wherein each bus bar is accommodated in a corresponding passage.

3. The battery system according to claim 2,
    wherein each passage includes a fluid inlet port and a fluid outlet port,
    wherein the fluid is introduced into the passage via the fluid inlet port, and the fluid is discharged from the passage from the fluid outlet port,
    wherein all of the fluid inlet ports are disposed on a first side of the system, and all of the fluid outlet ports are disposed on a second side of the system, and
    wherein the fluid inlet port faces the fluid outlet port.

4. The battery system according to claim 3, further comprising:
    one or more assembled batteries,
    wherein the assembled batteries are arranged along with a direction from the first side to the second side, and
    wherein all of the fluid outlet ports in one assembled battery disposed on the first side face all of the fluid inlet ports in another assembled battery disposed on the second side and adjacent to the one assembled battery.

5. The battery system according to claim 1,
    wherein the partition is made of insulation material.

6. The battery system according to claim 1,
    wherein each bus bar includes a member for increasing a surface area of the bus bar,
    wherein the member provides to increase a contact area with the fluid, and
    wherein the member is accommodated in a corresponding passage.

7. The battery system according to claim 1,
    wherein the fluid supplying element includes a fan and a casing for accommodating the fan,
    wherein the casing suctions the fluid from a suction opening according to rotation of the fan, and discharges the fluid from a discharge opening,
    wherein each passage is coupled with the discharge opening, and
    wherein the casing is integrated with the assembled battery.

8. The battery system according to claim 7,
    wherein each passage extends along with a flowing direction of the fluid,
    wherein the fluid supplying element is a blower for blowing air, and the fluid is air,
    wherein the air absorbs heat from the bus bar and the pair of electrodes so that the assembled battery is cooled, and
    wherein the air conducts heat to the bus bar and the pair of electrodes so that the assembled battery is heated.

9. The battery system according to claim 8,
    wherein each passage includes a fluid inlet port and a fluid outlet port, and
    wherein a path between the fluid outlet port and the fluid inlet port is straight.

10. The battery system according to claim 9,
    wherein all of the fluid inlet ports are disposed on a first side of the system, and all of the fluid outlet ports are disposed on a second side of the system,
    wherein the first side is opposite to the second side,
    wherein each battery cell extends along with the flowing direction of the fluid,
    wherein one electrode of each battery cell provides a positive electrode, and the other electrode provides a negative electrode, and wherein the positive electrode of one battery cell is coupled with the negative electrode of an adjacent battery cell.

11. The battery system according to claim 10, wherein current in the assembled battery flows in a zigzag manner, wherein each battery cell has a rectangular parallelepiped shape, wherein the plurality of battery cells are stacked in a stacking direction, which is perpendicular to the flowing direction of the fluid, and wherein a longitudinal direction of the rectangular parallelepiped shape of each battery cell is in parallel to the flowing direction of the fluid.

12. The battery system according to claim 11, wherein each bus bar includes a fin for increasing a surface area of the bus bar so that a cooling and heating performance of the battery cell is increased, and wherein each fin has a corrugated shape so that peaks and throughs are alternately repeated in the stacking direction.

* * * * *